Patented Nov. 21, 1944

2,363,471

UNITED STATES PATENT OFFICE 2,363,471

PROCESS OF RECOVERING BILE PIGMENTS

Jules D. Porsche and Robert H. Sifferd, Chicago, Ill., assignors to Armour and Company, Chicago, Ill., a corporation of Illinois No Drawing. Application June 1, 1940, Serial No. 338,433

15 Claims. (Cl. 260—314)

This invention relates to a method for recovering bile pigments from natural complexes containing them and more particularly to a method for cleaving such natural complexes to liberate bile pigments therefrom.

Bile pigments, including bilirubin, biliverdin, biliprasin and other such pigments, of which bilirubin is the most important and best known, are present in nature in the form of complex compounds. Bile pigments are generally considered to be breakdown products of hemoglobin and are believed to exist in bile, gall stones, meconium and other natural sources in the form of complex compounds with protein. The said pigments are useful therapeutically and in other ways, such as intermediates in preparing other chemical compounds, and the problem of recovering bile pigments from the natural sources described above has occasioned a great deal of investigation by workers in this field, and several processes for obtaining bile pigments have been proposed.

It has been known, for example, that bile pigments can be obtained from a natural source such as bile by allowing the bile to putrefy and thereafter extracting the putrefied product with a solvent for bile pigment. This is a wasteful process because some bilirubin is also attacked and broken down by the putrefactive organisms and, furthermore, the reaction gives rise to extremely unpleasant odors. It has also been known that bile pigment can be obtained from bile by treating the bile with ammonium hydroxide and thereafter precipitating with a calcium compound as described in Peterman, U. S. 2,049,134. The resulting precipitate contains calcium salts of bile pigments, calcium salts of bile acids and other substances. This precipitate is then treated to recover the bile pigments.

We have investigated the problem of recovering bile pigments from their natural sources and in the co-pending application of Porsche, et al., Serial No. 338,432, filed June 1, 1940, there is described a process for recovering the said pigments by subjecting materials naturally containing them to elevated temperatures in the presence of water. We have now discovered that cleavage of the natural complexes in which the bile pigments are evidently bound to proteins may be brought about by holding such complexes in an aqueous medium under mildly alkaline and non-putrefying conditions at normal temperatures, or below, to increase the hydroxyl ion concentration of the medium and to form soluble salts of the bile pigment. After the formation of the pigment salt the solution is acidified to free the pigment from its salt and the mixture is then extracted and the pigment recovered.

In this way we can obtain an extract containing bilirubin, for example, which may be further purified to give a final bilirubin product of high purity or the solvent may be evaporated to give a crude bilirubin admixed with some impurities. We have found that by maintaining an aqueous solution of bile pigment complex at a pH of from, preferably about 7.5 to about 12.0, for, preferably, from about two to twelve days at room temperatures or below, if desired in the presence of a mild preservative, we obtain a solution in which the bile pigment has been liberated from the complex containing it and converted to its salt without appreciable loss of the pigment from oxidative or hydrolytic changes or those changes brought about by putrefactive organisms. The solution so obtained is then acidified and extracted with a suitable water immiscible solvent such as chlorinated hydrocarbon, carbon disulfide, toluene or the like to give an impure solution of bile pigment from which the said pigment may be recovered with very little loss and in a high state of purity.

We have found that such putrefactive organisms do not grow and propagate in the natural complex in aqueous media when the media are held at a pH of above 10.0, the amount of alkali being present under such conditions being effective as a preservative. When the media are held at a pH of above 7.5 but at less than pH 10.0 we have further discovered that non-putrefying conditions are maintained by adding a small amount of a mild preservative such as monochlorbenzol. The preservative has proved insufficient alone to prevent putrefaction but does act to prevent it in the presence of such small amounts of added alkali such as sodium hydroxide, potassium hydroxide and the like.

The treated material is allowed to stand until cleavage of the pigment has taken place and is then acidified. After acidification with any suitable acid such as acetic, hydrochloric and the like, the mixture is extracted with a water-immiscible organic solvent, for example, carbon disulfide, monochlorbenzene, chloroform and the like. Alternatively, the solvent may be added first and the solution then acidified, after which acidification the solution acts to dissolve the liberated pigment. The resulting extract is separated from the aqueous phase and contains the liberated bile pigments along with other substances which are preferentially dissolved by the organic solvent, such substances including lipoids, fatty acids, bile acids and others. The extract may be treated with a weak base and then with a strong base as described in the co-pending application to Sifferd et al., Serial No. 338,434, filed June 1, 1940, to recover a highly purified bilirubin therefrom. Alternatively, it may be evaporated to dryness to obtain a mixture of bile pigments with the other accompanying substances, which may then be further processed.

The following is a specific example of the process of this invention:

*Example 1*

To 500 parts by weight of hog bile containing 0.046 parts by weight of bilirubin per 100 parts by weight of bile are added 10 parts by weight of monochlorbenzol and the pH is adjusted to 9.7 by the addition of sodium hydroxide. The whole is allowed to stand for two days and is then acidified to a pH of about 6.5 with acetic acid. The acidified mass is extracted with about an equal volume of monochlorbenzene, suitably at about 170° F., with stirring for about half an hour. The separated monochlorbenzene phase is drawn off, and may now be stored or further processed in any desired manner.

A portion of the above monochlorbenzene extract was treated to recover bilirubin and a yield of 0.033 part by weight of bilirubin per 100 parts by weight of starting material (bile) was obtained.

*Example 2*

To 750 parts by weight of beef bile are added 25 parts by weight of a 1.0% solution of sodium bisulfite and 25 parts by weight of monochlorbenzene, as preservatives, and the whole is adjusted to a pH of 9.6 and allowed to stand for four days. At the end of this time, the solution is acidified to pH 6.5 and extracted with an equal volume of monochlorbenzene, suitably with boiling. The separated monochlorbenzene phase is drawn off and contains the desired bile pigments together with other substances soluble in lipoid solvents. The extract is treated with a moist weakly basic substance and then with a moist stronger base as described above and there is obtained a yield of 0.0069 part by weight of a highly purified bilirubin per 100 parts by weight of starting bile. The said starting bile contained .014 part by weight of bilirubin per 100 parts by weight of bile.

In a control test in which the bile is treated in Example 2 except that no alkali was added to the solution, no bile pigment was recovered upon acidification and extraction.

In another test on the same beef bile in which the solution was allowed to stand one day, 0.0043 part by weight of bilirubin, per 100 parts by weight of bile was obtained upon acidification, extraction and subsequent purification as described above. In still other tests in which bile was treated with a mild preservative and a small amount of alkali and allowed to stand at room temperature for from 12 to 21 days, decreased yields were obtained and it is preferable to allow the reaction to proceed at room temperatures for periods of from two to twelve days. At refrigerator temperatures, for example, the time of standing can be increased.

It is essential that non-putrefying conditions be maintained as described as otherwise the bilirubin present in the solution or mixture is rapidly destroyed, possibly by oxidative or putrefactive action, and as result the yield is greatly diminished. Also, as before stated, it is essential that the aqueous medium be mildly alkaline since an excess of hydroxyl ions brings about cleavage of the natural complex upon standing.

The foregoing description has been given for clearness of explanation only and no unnecessary limitations should be understood therefrom. It will be understood that various modifications may be made in the procedure without departing from the scope of the invention.

Having now described our invention, what we wish to claim is:

1. A process for recovering bile pigment from a natural complex containing the same which comprises maintaining said natural complex in the presence of water and a preservative agent and alkali in amount to give a pH of more than about 7.5 at a temperature not in excess of room temperature until the water-soluble salt of said pigment has formed, acidifying the resulting liquid mixture, extracting said mixture with a water-immiscible organic solvent, and recovering the bile pigment from the extract thus obtained.

2. A process for recovering bile pigment from a natural complex containing the same which comprises maintaining said natural complex in the presence of water and a small amount of a preservative agent and alkali in amount to give a pH of between 7.5 and 12.0 until the water-soluble salt of said pigment has formed, acidifying the resulting liquid mixture, extracting said mixture with a water-immiscible organic solvent, and recovering the bile pigment from the extract thus obtained.

3. A process as in claim 1 where said natural complex is contained in animal bile.

4. A process for recovering a bile pigment from animal bile comprising adjusting the pH of the bile with alkali to from 7.5 to 12.0, adding a small amount of a preservative, holding said bile containing said preservative and adjusted as to pH until said pigment is freed from the complex containing it and forms its water-soluble salt, adding acid to the altered bile mixture to free said pigment from its water-soluble salt, and extracting the acidified mixture with a water-immiscible organic solvent to recover the bile pigment therefrom.

5. A process as in claim 1 in which said bile pigment is bilirubin.

6. A process as in claim 3 in which said bile pigment is bilirubin.

7. A process as in claim 3 in which said preservative is monochlorbenzene.

8. A process as in claim 3 in which said preservative and said water-immiscible solvent are monochlorbenzene.

9. A process as in claim 4 in which the animal bile adjusted as to pH and containing a small amount of preservative is held for a period of two to ten days before the addition of acid.

10. A process for recovering bile pigment from a natural complex containing the same which comprises maintaining said natural complex in the presence of water and alkali in amount to give a pH of more than 10.0 but not sufficient to produce saponification until said pigment is freed from said complex containing it and forms its water-soluble salt, acidifying the resulting mixture, extracting said liquid mixture with a water-immiscible organic solvent, and recovering the bile pigment from the extract thus obtained.

11. A process for recovering a bile pigment from a natural complex containing the same which comprises maintaining said natural complex in the presence of water and a preservative agent and alkali in amount to give a pH of more than about 7.5 but not sufficient to produce saponification until said pigment is freed from said complex containing it and forms its salt, adding a water-immiscible organic solvent to the mixture, acidifying the mixture, heating and agitating the mixture, withdrawing the solvent extract, and recovering the bile pigment from said extract.

12. A process for recovering a bile pigment from a natural complex containing the same which comprises maintaining said natural complex in water containing a preserving agent and alkali in amount to give a pH of more than about 7.5 but not sufficient to produce saponification until said pigment is freed from said complex and forms a water-soluble salt, adding acid to the liquid containing the said water-soluble salt to liberate the said pigment from its salt, adding a water-immiscible organic solvent to the acidified liquid mixture, heating the said mixture together with said solvent, withdrawing the solvent extract, and recovering the bile pigment from said extract.

13. A process as in claim 12 in which the bile pigment is bilirubin.

14. Process for treating animal bile to recover bilirubin therefrom which comprises adding sodium hydroxide to said bile to pH from about 7.5 to about 12.0, adding a small amount of a preservative agent, holding the treated bile for at least two days, acidifying the said bile to pH of about 6.5, extracting the said acidified bile with monochlorbenzene, and recovering the monochlorbenzene extract.

15. A process for recovering bile pigment from a natural complex containing the same which comprises maintaining said natural complex in the presence of water and a preservative agent and alkali in amount sufficient to give a pH of more than 7.5 but not sufficient to produce saponification until the water soluble salt of said pigment has formed, acidifying the resulting liquid mixture, extracting said mixture with a water-immiscible organic solvent, and recovering the bile pigment from the extract thus obtained.

JULES D. PORSCHE.
ROBERT H. SIFFERD.